United States Patent
Penny et al.

(10) Patent No.: US 11,029,858 B1
(45) Date of Patent: Jun. 8, 2021

(54) SYSTEMS AND METHOD FOR ENHANCING COMPUTER SECURITY AND REDUNDANCY

(71) Applicant: Kara Partners LLC, Midlothian, VA (US)

(72) Inventors: Brian Penny, Astoria, NY (US); Giovanni Viscardi, Richmond, VA (US)

(73) Assignee: Kara Partners LLC, Midlothian, VA (US)

( * ) Notice: Subject to any disclaimer, the term of this patent is extended or adjusted under 35 U.S.C. 154(b) by 0 days.

(21) Appl. No.: 16/839,672

(22) Filed: Apr. 3, 2020

(51) Int. Cl.
| | |
|---|---|
| *H04K 1/00* | (2006.01) |
| *H04L 9/32* | (2006.01) |
| *H04L 29/06* | (2006.01) |
| *G06F 3/06* | (2006.01) |
| *G06F 21/62* | (2013.01) |

(52) U.S. Cl.
CPC ............ *G06F 3/062* (2013.01); *G06F 3/0614* (2013.01); *G06F 3/0679* (2013.01); *G06F 21/6218* (2013.01); *H04L 9/3247* (2013.01); *H04L 63/0435* (2013.01); *H04L 63/061* (2013.01); *H04L 63/0876* (2013.01)

(58) Field of Classification Search
CPC ...... G06F 3/0614; G06F 3/062; G06F 3/0679; G06F 21/6218; H04K 1/00; H04L 9/3247; H04L 63/0435; H04L 63/061; H04L 63/0876
USPC .... 380/28, 30, 268, 285; 713/171, 176, 177, 713/189
See application file for complete search history.

(56) References Cited

U.S. PATENT DOCUMENTS

| | | | |
|---|---|---|---|
| 8,213,607 B2* | 7/2012 | Rose | H04L 9/0662 380/44 |
| 2007/0038931 A1 | 2/2007 | Allaire et al. | |
| 2010/0077212 A1* | 3/2010 | McReynolds | H04N 21/835 713/168 |
| 2010/0250703 A1* | 9/2010 | Steadman | H04H 60/04 709/217 |
| 2016/0112188 A1* | 4/2016 | Choi | H04L 9/0618 380/28 |
| 2020/0133956 A1* | 4/2020 | Cannon | G06F 16/27 |

OTHER PUBLICATIONS

"Open-Source Generation for FPGAs"—Ritesh K. Soni, Virginia Polytechnic Institute and State University, Aug. 9, 2013 https://vtechworks.lib.vt.edu/bitstream/handle/10919/51836/Soni_RK_T_2013.pdf?sequence=1&isAllowed=y (Year: 2013).*
International Search Report and Written Opinion dated Apr. 20, 2021 issued in PCT Application No. PCT/US2021/024559.

* cited by examiner

*Primary Examiner* — Randy A Scott
(74) *Attorney, Agent, or Firm* — Troutman Pepper Hamilton Sanders LLP; Dustin B. Weeks; Brennan M. Carmody

(57) ABSTRACT

A method of encoding data, including: obtaining a data stream comprising a first sequence of values; duplicating of the first sequence of values; offsetting the duplicate first sequence of values; braiding the first sequence of values and the offset duplicate first sequence of values, creating a braided data sequence; and outputting the braided data sequence.

19 Claims, 5 Drawing Sheets

SYSTEMS AND METHOD FOR ENHANCING COMPUTER SECURITY AND REDUNDANCY

TECHNICAL FIELD

Generally, the present disclosure relates to computer security. More particularly, the present disclosure relates to systems and methods for enhancing computer security and providing data redundancy.

BACKGROUND

Over the past few decades, the extensive use of computers and computer networks has enabled widespread document creation and distribution. Although such production and distribution is generally useful, there is a need to limit the ability of bad actors to access documents, especially those of a sensitive nature. Concerns regarding the privacy of certain data (for example, an individual's social security number, credit history, medical history, business trade secrets, and financial data) is an important issue in modern systems. As will be understood, data can be compromised either at rest (e.g., by a bad actor hacking or otherwise accessing a system's storage) or in transit (e.g., by intercepting a stream of the data).

Additionally, data corruption and/or loss is a persistent issue. This corruption can likewise come from bad actors (e.g., through unauthorized access to a system or tampering of data packets). However, data corruption or loss can also occur innocently, for example, through the degradation of physical storage devices or by lost data packets in a network transfer. Accordingly, companies spend vast amounts of money attempting to ensure data communications across an external network, e.g., the Internet, remain secure and valid.

To combat hackers, conventional data communication systems have relied on various methods for user authentication and/or access control, including encryption algorithms to encrypt data locally at a computer/server prior to that data being transmitted over an external network. Unfortunately, because many of these conventional systems are directly connected to an external network, hackers can simply use a "backdoors" of the local computes/serves to obtain data that is sought to be secured either before it is encrypted or after it is decrypted. Accordingly, there is a desire for more effective technologies for user authentication and/or access control are desired.

BRIEF SUMMARY

The present disclosure may at least partially address at least one of the above. However, the present disclosure may prove useful to other technical areas. Therefore, the claims should not be construed as necessarily limited to addressing any of the above.

According to an example embodiment of the present disclosure, there is provided a method of encoding data, including: obtaining a data stream including a first sequence of values; duplicating of the first sequence of values; offsetting the duplicate first sequence of values; braiding the first sequence of values and the offset duplicate first sequence of values, creating a braided data sequence; and outputting the braided data sequence.

According to an example embodiment of the present disclosure, there is provided a method of encoding data, including: obtaining a data stream comprising a first sequence of values; duplicating of the first sequence of values; offsetting the duplicate first sequence of values; generating a randomized sequence of values; braiding the first sequence of values, the offset duplicate first sequence of values, and the randomized sequence of values, creating a braided data sequence; and outputting the braided data sequence.

According to an example embodiment of the present disclosure, there is provided a method of encoding data, including: obtaining a first data stream comprising a first sequence of values; obtaining a second data stream comprising a second sequence of values; obtaining a third data stream comprising a third sequence of values; braiding the first sequence of values, the second sequence of values, and the third sequence of values, creating a braided data sequence; and outputting the braided data sequence.

According to an example embodiment of the present disclosure, there is provided a method of encoding data, including: obtaining a data stream comprising a sequence of values; dividing the first sequence of values into a plurality of value sections; braiding the plurality of data sections together, creating a braided data sequence; and outputting the braided data sequence.

The present disclosure may be embodied in the form illustrated in the accompanying drawings. However, attention is called to the fact that the drawings are illustrative. Variations are contemplated as being part of the disclosure, limited only by the scope of the claims.

BRIEF DESCRIPTION OF THE DRAWINGS

The accompanying drawings illustrate example embodiments of the present disclosure. Such drawings are not to be construed as necessarily limiting the disclosure. Like numbers and/or similar numbering schemes can refer to like and/or similar elements throughout.

DETAILED DESCRIPTION

Figure 1:
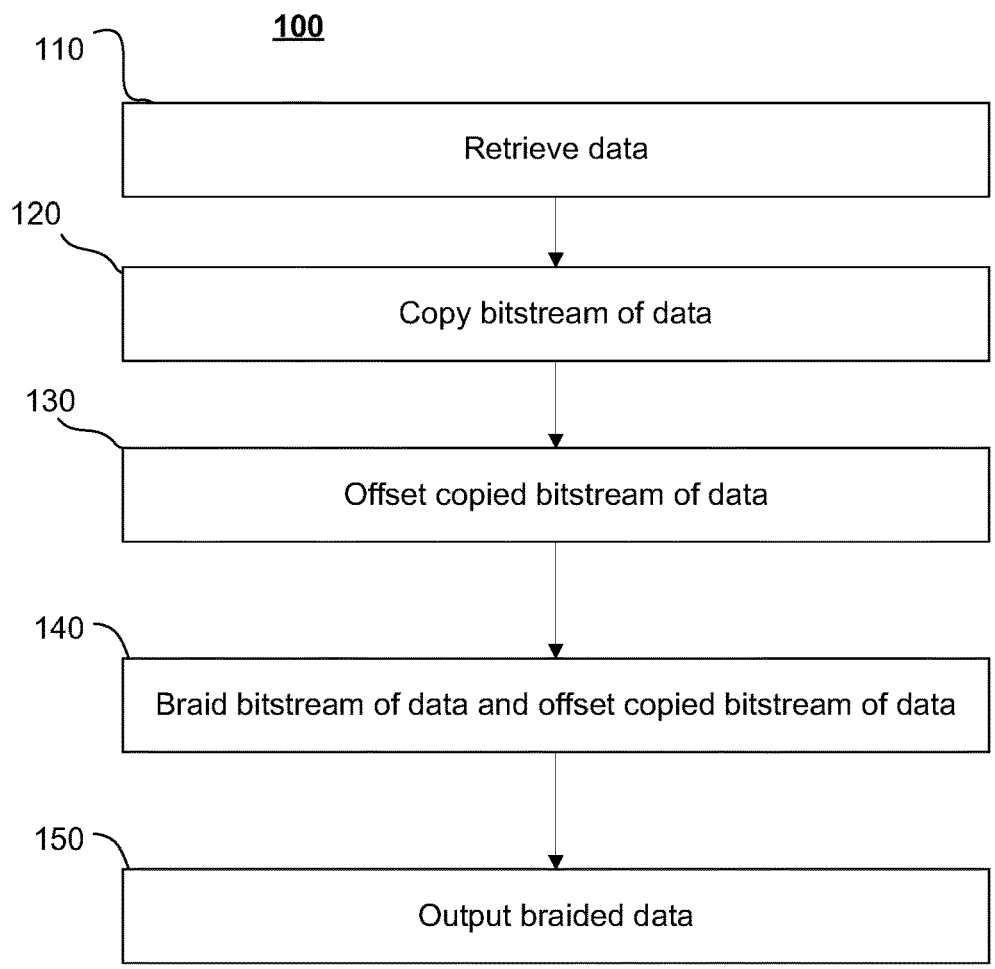
FIG. 1 shows a flowchart of an example embodiment of a method for enhancing computer security according to the present disclosure.

Aspects of the present disclosure are related to data encryption and/or data authentication. This can be accomplished by braiding bitstreams together for transmission or storage. The braided data may not be readily understandable by an intercepting third-party. In an embodiment, a bitstream is braided with an offset copy of itself. In this way, once unbraided, the bitstream may be compared to its copy to confirm the authentication of the data. Additionally, in an embodiment, the data may be braided with randomized data (e.g., a three-part braiding of the original data, the offset data, and randomized data).

In some embodiments, multiple data streams may be braided together. For example, three distinct data streams may be braided together to create one long stream of encrypted data. In other cases, a single bitstream may be divided into multiple sections. The sections may be braided together to rearrange the data bitstream.

The present disclosure will now be described more fully with reference to the accompanying drawings, in which example embodiments of the disclosure are shown. The disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Features described with respect to certain embodiments may be combined in various other embodiments. Different aspects and elements of the embodiments may be combined in a similar manner. The disclosed embodiments may individually and/or collectively be components of a larger system, wherein other procedures may take precedence over and/or otherwise modify their application. A number of steps may be required before, after, and/or concurrently with the disclosed embodiments. Processes disclosed herein can be performed by one and/or more entities in any way according to the principles of the present disclosure.

The terminology used herein can imply direct or indirect, full or partial, action or inaction. For example, when an element is referred to as being "on," "connected" or "coupled" to another element, then the element can be directly connected or coupled to the other element or intervening elements may be present. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and will not be interpreted in an idealized or overly formal sense unless expressly so defined herein.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

FIG. 1 is a flowchart 100 of a method for enhancing computer security according to aspects of the present disclosure. The method may be performed, for example, by one or more processors, through specialized hardware processing, or through programmed or programmable electronics.

Referring to FIG. 1, the method includes retrieving 110 data (e.g., a bitstream). The data may be a stored file or a flow of data. The data's bitstream is copied 120 and offset 130 from the original bitstream. For example, in a case of a stored file, a copy of the data may be stored in memory (e.g., volatile memory), while, in a case of a flow of data, the copy may be stored in a buffer or routed through a delay circuit. The bitstream of data and the offset copy of the bitstream are then braided 140 together to create an encrypted and redundant data stream. The order of braiding (i.e., when the braided stream switched between the different versions of the data) may be reflected in a decoding key. For example, a listing of which data belongs to which stream (i.e., the original file or the copy) may be encrypted using a public key (e.g., of a key pair) or a private key (e.g., of a symmetric private key system). By decrypting the listing, a system may decode the braided date. Then the braided data is output 150, either for transmission or storage.

Figure 2:
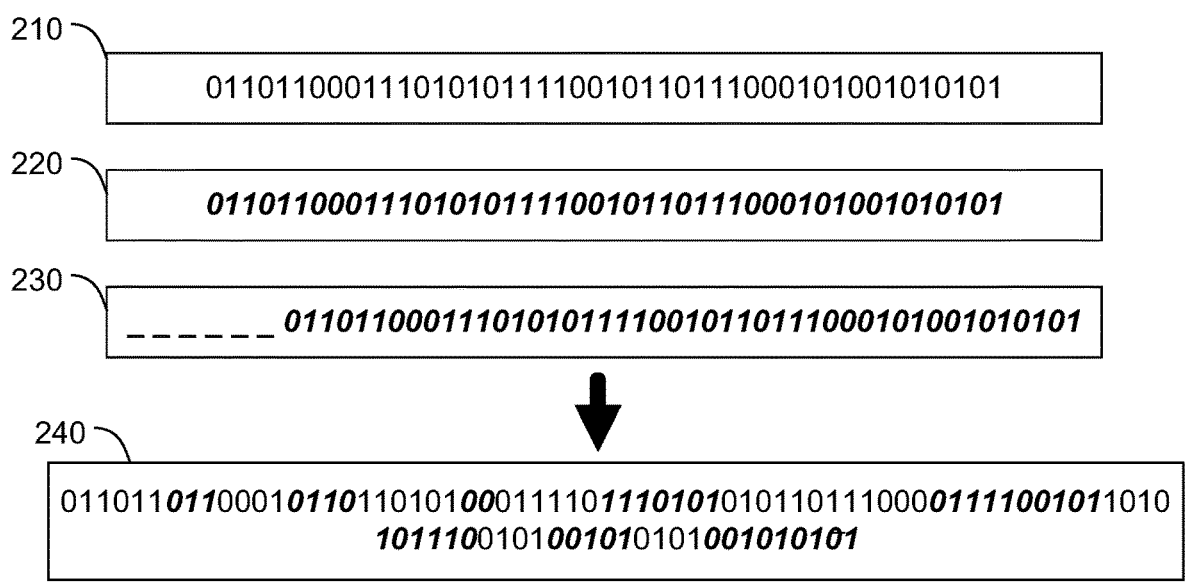
FIG. 2 illustrates an example of data braiding in accordance with the example of FIG. 1.

FIG. 2 illustrates an example of braiding data in accordance with the method described in FIG. 1. The original data 210 is retrieved, and copied, creating copied data 220. The copied data 220 is offset, creating offset data 230. The original data 210 and offset data 230 are then braided together, forming braided data 240. One of ordinary skill will recognize that this is merely an example, and various changes or alteration can be made without departing from the scope of the present disclosure.

Figure 3:
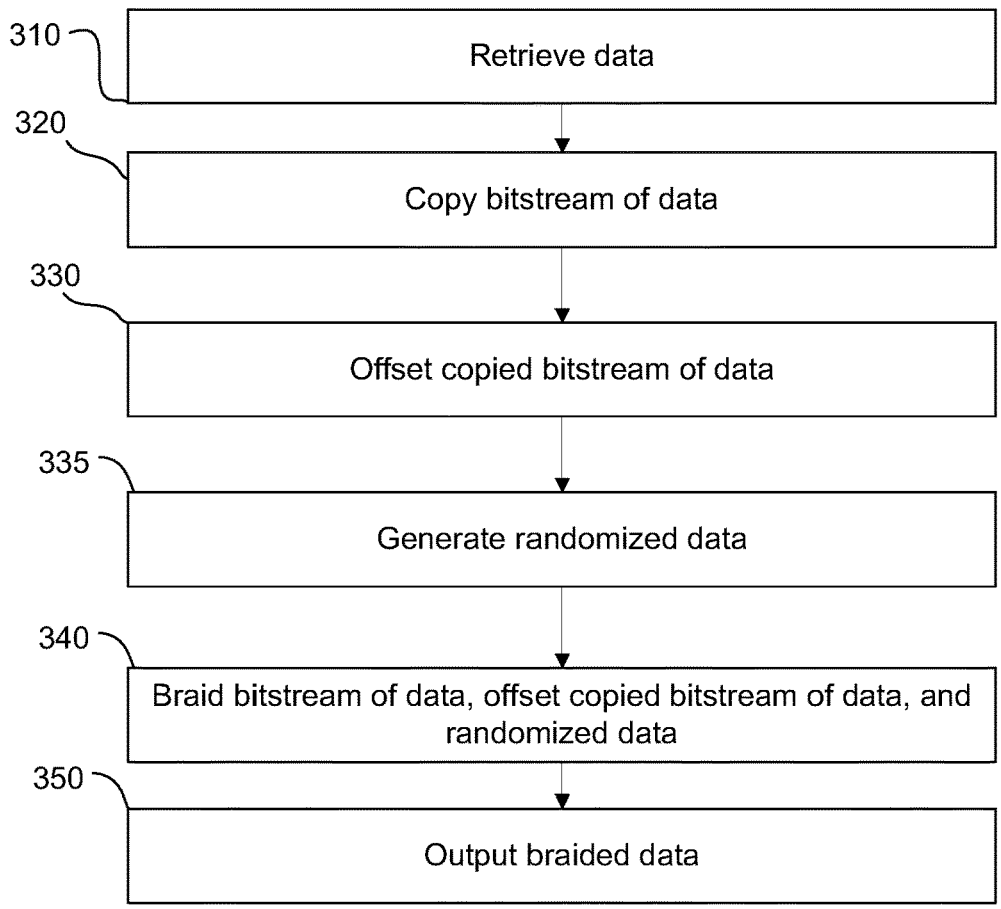
FIG. 3 shows a flowchart of an example embodiment of a method for enhancing computer security according to the present disclosure.

FIG. 3 is a flowchart 300 of a method for enhancing computer security according to aspects of the present disclosure. The method may be performed, for example, by one or more processors, through specialized hardware processing, or through programmed or programmable electronics.

Referring to FIG. 3, the method includes retrieving 310 data (e.g., a bitstream). The data may be a stored file or a flow of data. The data's bitstream is copied 320 and offset 330 from the original bitstream. For example, in a case of a stored file, a copy of the data may be stored in memory, while, in a case of a flow of data, the copy may be stored in a buffer or routed through a delay circuit. Then, a randomized bitstream is generated 335. Generating 335 the randomized bitstream may include generating a full length of a bitstream (e.g., in memory), or generating the randomized bitstream as needed. Finally, the bitstream of data, the offset copy of the bitstream, and the randomized bitstream are braided 340 together to create an encrypted and redundant data stream, and the braided data is output 350, either for transmission or storage.

Figure 4:
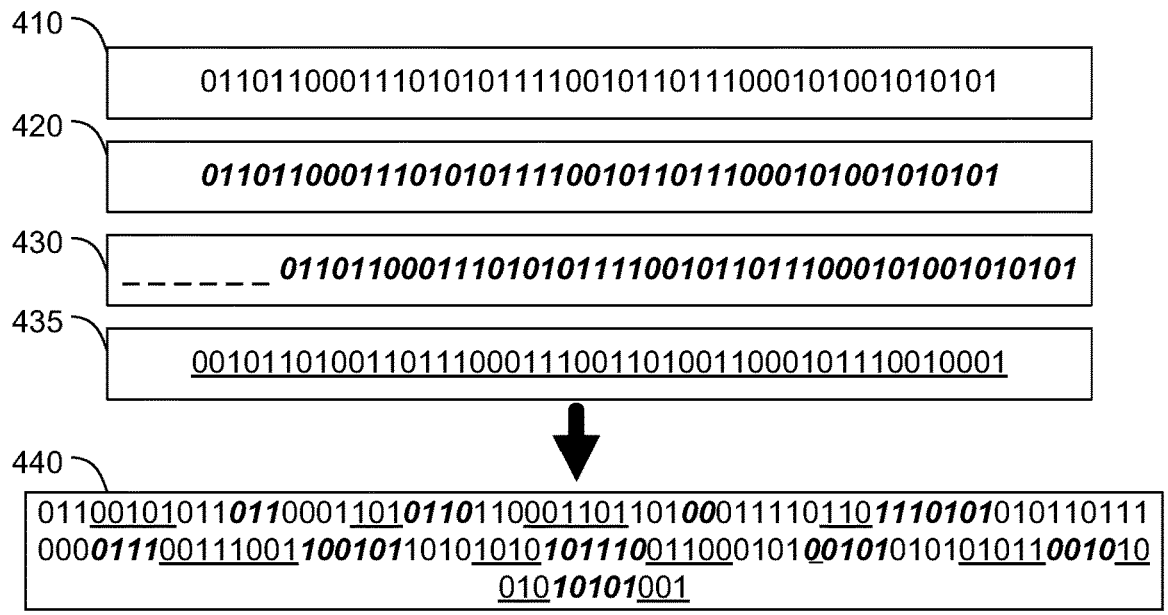
FIG. 4 illustrates an example of data braiding in accordance with the example of FIG. 3.

FIG. 4 illustrates an example of braiding data in accordance with the method described in FIG. 3. The original data 410 is retrieved, and copied, creating copied data 420. The copied data 320 is offset, creating offset data 430. Randomized data 435 is generated, and the original data 410, offset data 430, and randomized data 435 are then braided together, forming braided data 440. One of ordinary skill will recognize that this is merely an example, and various changes or alteration can be made without departing from the scope of the present disclosure.

Figure 5:
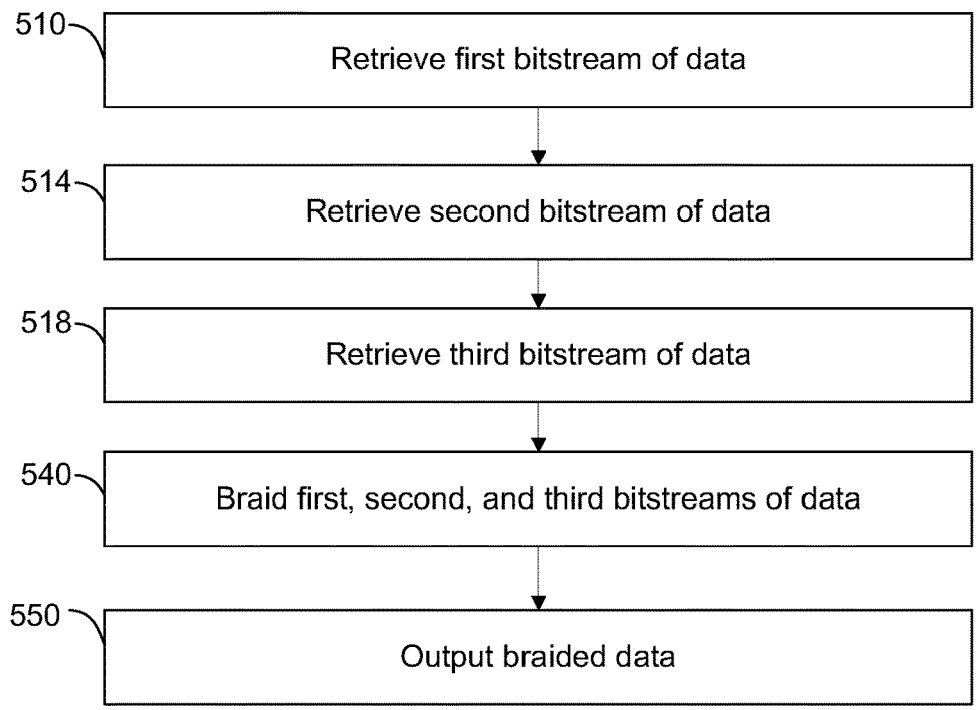
FIG. 5 shows a flowchart of an example embodiment of a method for enhancing computer security according to the present disclosure.

FIG. 5 is a flowchart 500 of a method for enhancing computer security according to aspects of the present disclosure. The method may be performed, for example, by one or more processors, through specialized hardware processing, or through programmed or programmable electronics.

Referring to FIG. 5, the method includes retrieving 510 first data (e.g., a first bitstream of data), retrieving 514 second data (e.g., a second bitstream of data), and retrieving 518 third data (e.g., a third bitstream of data). The first-third data may be a stored file or a flow of data. The first, second, and third bitstreams of data are braided 540 together to create an encrypted data stream. The encrypted data stream is then output 550, either for transmission or storage.

Furthermore, by encoding multiple streams of data together, the total data volume required for transmission and/or storage may be reduced. For example, when individual streams of data are encrypted separately, an overhead of encryption information and "junk" data must be stored and/or transmitted with each individual stream. However, by braiding multiple streams of data together, total overhead is reduced. For example, the individual streams act as the "junk" data for other streams, while single decoding information may be used for all braided streams.

Figure 6:
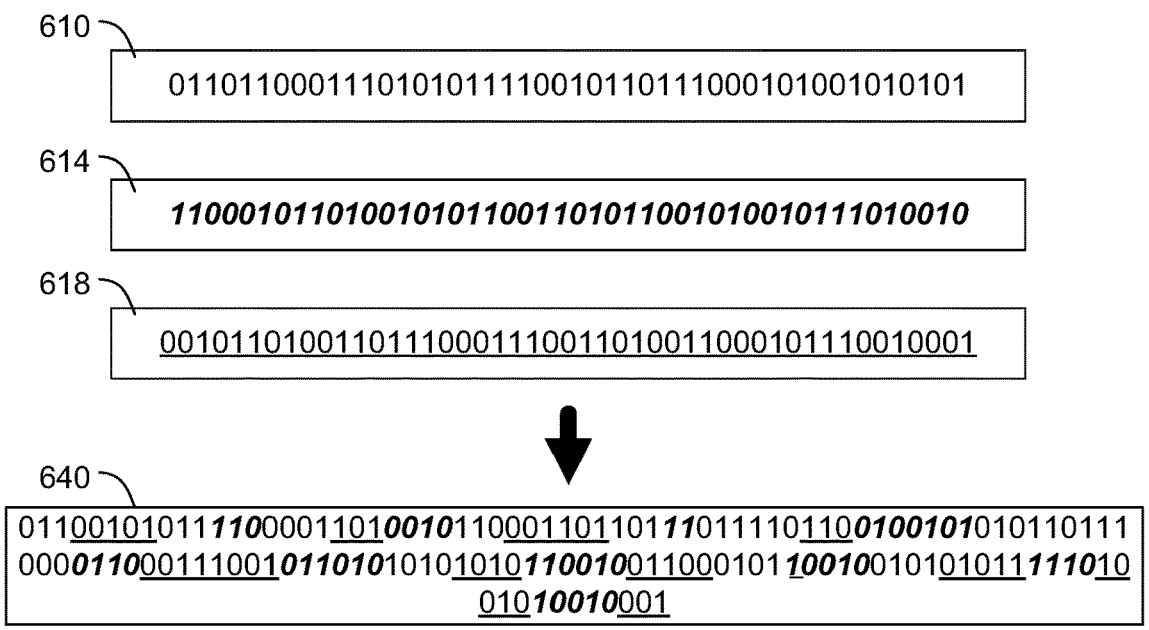
FIG. 6 illustrates an example of data braiding in accordance with the example of FIG. 5.

FIG. 6 illustrates an example of braiding data in accordance with the method described in FIG. 5. The first data 610, second data 614, and third data 618 are retrieved. These three data streams are then braided together, forming braided data 640. One of ordinary skill will recognize that this is merely an example, and various changes or alteration can be made without departing from the scope of the present disclosure.

Figure 7:
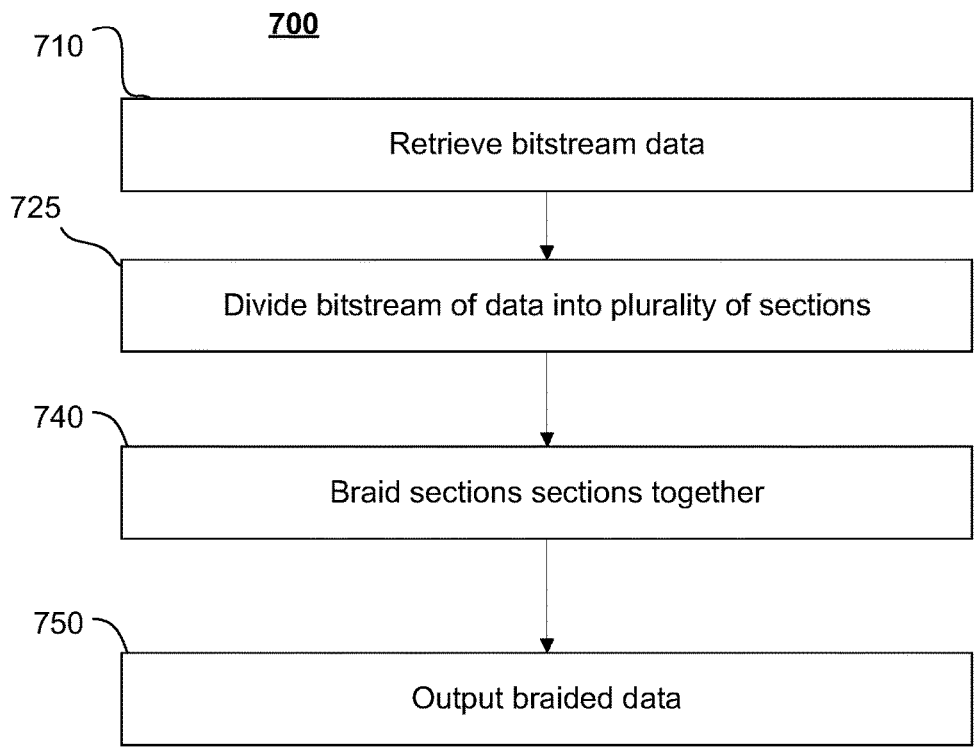
FIG. 7 shows a flowchart of an example embodiment of a method for enhancing computer security according to the present disclosure.

FIG. 7 is a flowchart 700 of a method for enhancing computer security according to aspects of the present disclosure. The method may be performed, for example, by one or more processors, through specialized hardware processing, or through programmed or programmable electronics.

Referring to FIG. 7, the method includes retrieving 710 data (e.g., a bitstream). The data may be a stored file or a flow of data. The data's bitstream is divided 725 into a plurality of sections (e.g., three or more sections). For example, in a case of a stored file, a copy of the data may be stored in a plurality of sections in memory, while, in a case of a flow of data, the data may be stored in time-delay buffers in sections. The sections of data are braided 740 together to create an encrypted data stream. The encrypted data stream is then output 750, either for transmission or storage.

Figure 8:
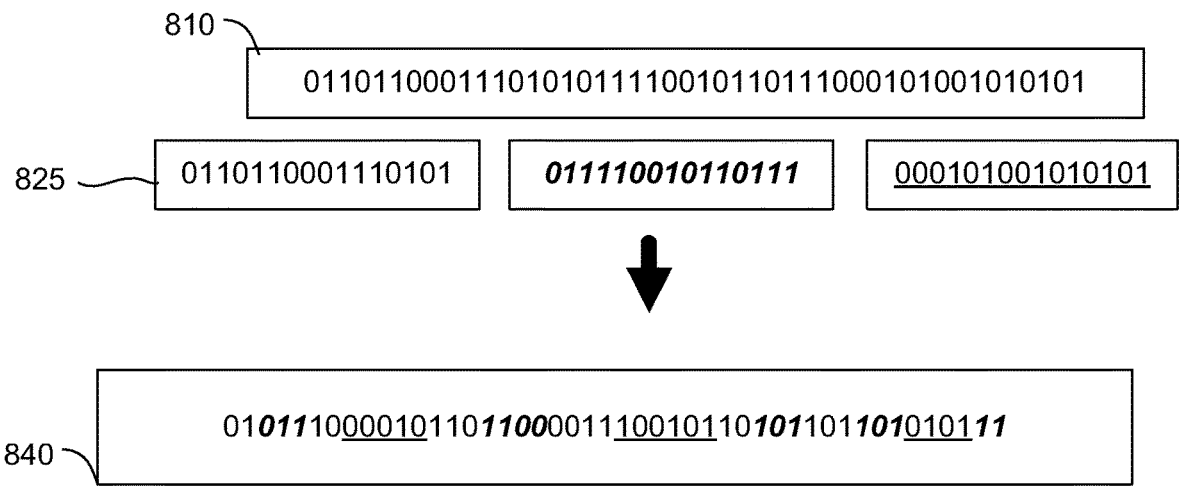
FIG. 8 illustrates an example of data braiding in accordance with the example of FIG. 7.

FIG. 8 illustrates an example of braiding data in accordance with the method described in FIG. 7. The data 810 is received and divided into a plurality of data sections 825. Although three data sections 825 are illustrated, this is merely an example. In some cases, the data 810 may be divided into two sections 825 or four or more sections 825. These data sections 825 are then braided together, forming braided data 840. One of ordinary skill will recognize that this is merely an example, and various changes or alteration can be made without departing from the scope of the present disclosure.

Figure 9:
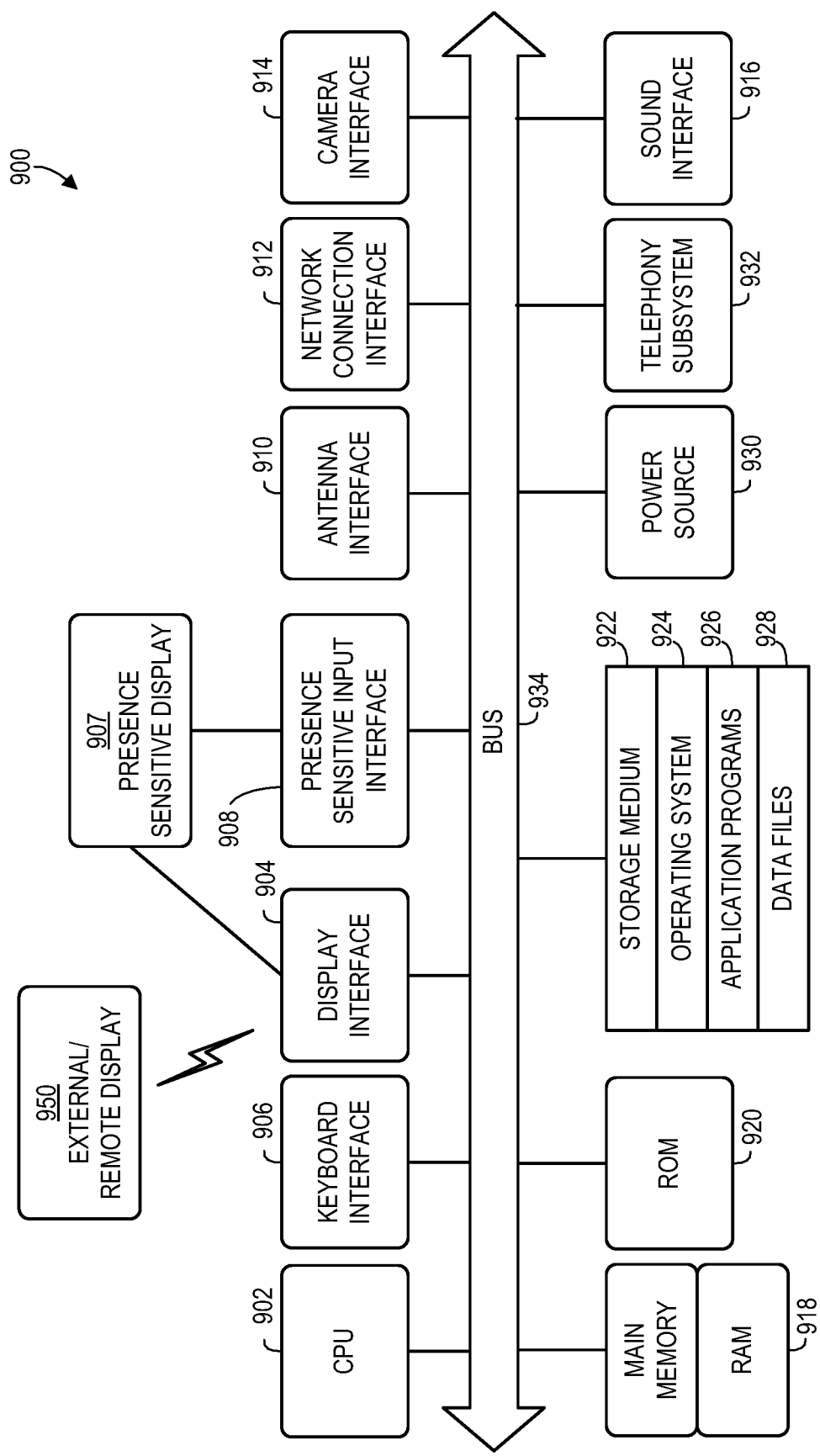
FIG. 9 is an example computer architecture for implementing aspects of the present disclosure.

FIG. 9 is a block diagram of an illustrative computer system architecture 900, according to an example implementation. As non-limiting examples, processor 152, wheel-mounted processor 217, and an external computing device may be implemented using one or more elements from the computer system architecture 900. It will be understood that the computing device architecture 900 is provided for example purposes only and does not limit the scope of the various implementations of the present disclosed systems, methods, and computer-readable mediums.

The computing device architecture 900 of FIG. 9 includes a central processing unit (CPU) 902, where computer instructions are processed, and a display interface 904 that acts as a communication interface and provides functions for rendering video, graphics, images, and texts on the display. In certain example implementations of the disclosed technology, the display interface 904 may be directly connected to a local display, such as a touch-screen display associated with a mobile computing device. In another example implementation, the display interface 904 may be configured for providing data, images, and other information for an external/remote display 950 that is not necessarily physically connected to the mobile computing device. For example, a desktop monitor may be used for mirroring graphics and other information that is presented on a mobile computing device. In certain example implementations, the display interface 904 may wirelessly communicate, for example, via a Wi-Fi channel or other available network connection interface 912 to the external/remote display 950.

In an example implementation, the network connection interface 912 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 904 may be operatively coupled to a local display, such as a touch-screen display associated with a mobile device. In another example, the display interface 904 may be configured to provide video, graphics, images, text, other information, or any combination thereof for an external/remote display 950 that is not necessarily connected to the mobile computing device. In one example, a desktop monitor may be used for mirroring or extending graphical information that may be presented on a mobile device. In another example, the display interface 904 may wirelessly communicate, for example, via the network connection interface 912 such as a Wi-Fi transceiver to the external/remote display 950.

The computing device architecture 900 may include a keyboard interface 906 that provides a communication interface to a keyboard. In one example implementation, the computing device architecture 900 may include a presence-sensitive display interface 908 for connecting to a presence-sensitive display 907. According to certain example implementations of the disclosed technology, the presence-sensitive display interface 908 may provide a communication interface to various devices such as a pointing device, a touch screen, a depth camera, etc. which may or may not be associated with a display.

The computing device architecture 900 may be configured to use an input device via one or more of input/output interfaces (for example, the keyboard interface 906, the display interface 904, the presence sensitive display interface 908, network connection interface 912, camera interface 914, sound interface 916, etc.) to allow a user to capture information into the computing device architecture 900. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 900 or may be a separate device. For example, the input device may be an accelerometer, a magnetometer, a digital camera, a microphone, and an optical sensor.

Example implementations of the computing device architecture 900 may include an antenna interface 910 that provides a communication interface to an antenna; a network connection interface 912 that provides a communication interface to a network. As mentioned above, the display interface 904 may be in communication with the network connection interface 912, for example, to provide information for display on a remote display that is not directly connected or attached to the system. In certain implementations, a camera interface 914 is provided that acts as a communication interface and provides functions for capturing digital images from a camera. In certain implementations, a sound interface 916 is provided as a communication interface for converting sound into electrical signals using a microphone and for converting electrical signals into sound using a speaker. According to example implementations, a random-access memory (RAM) 918 is provided, where computer instructions and data may be stored in a volatile memory device for processing by the CPU 902.

According to an example implementation, the computing device architecture 900 includes a read-only memory (ROM) 920 where invariant low-level system code or data for basic system functions such as basic input and output (I/O), startup, or reception of keystrokes from a keyboard are stored in a non-volatile memory device. According to an example implementation, the computing device architecture 900 includes a storage medium 922 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 924, application programs 926 (including, for example, a web browser application, a widget or gadget engine, and or other applications, as necessary) and data files 928 are stored. According to an example implementation, the computing device architecture 900 includes a power source 930 that provides an appropriate alternating current (AC) or direct current (DC) to power components.

According to an example implementation, the computing device architecture 900 includes a telephony subsystem 932 that allows the device 900 to transmit and receive sound over a telephone network. The constituent devices and the CPU 902 communicate with each other over a bus 934.

According to an example implementation, the CPU 902 has appropriate structure to be a computer processor. In one arrangement, the CPU 902 may include more than one processing unit. The RAM 918 interfaces with the computer bus 934 to provide quick RAM storage to the CPU 902 during the execution of software programs such as the operating system application programs, and device drivers. More specifically, the CPU 902 loads computer-executable process steps from the storage medium 922 or other media into a field of the RAM 918 to execute software programs. Data may be stored in the RAM 918, where the data may be accessed by the computer CPU 902 during execution.

The storage medium 922 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 922, which may include a machine-readable storage medium.

According to one example implementation, the term computing device, as used herein, may be a CPU, or conceptualized as a CPU (for example, the CPU 902 of FIG. 9). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

An embodiment of the present disclosure may be implemented according to at least the following:

Clause 1: A method of encoding data, comprising: obtaining a data stream comprising a first sequence of values; duplicating of the first sequence of values; offsetting the duplicate first sequence of values; braiding the first sequence of values and the offset duplicate first sequence of values, creating a braided data sequence; and outputting the braided data sequence.

Clause 2: The method of Clause 1, wherein duplicating the first sequence of values comprises generating a duplicate of the first sequence of values in volatile memory.

Clause 3: The method of Clause 1 or Clause 2, wherein duplicating the first sequence of values comprises storing the first sequence of values in a time-delayed buffer.

Clause 4: The method of any of Clauses 1-3, wherein offsetting the duplicate first sequence of values comprises feeding the duplicate first sequence of values through a delay circuit.

Clause 5: The method of any of Clauses 1-4, where outputting the braided data sequence comprises transmitting the braided data sequence to a remote system.

Clause 6: The method of any of Clauses 1-5 further comprising storing the braided data sequence in a persistent memory.

Clause 7: The method of any of Clauses 1-6 further comprising generating a decoding key for decoding the braided data sequence.

Clause 8: The method of Clause 7 further comprising encrypting the decoding key.

Clause 9: A method of encoding data, comprising: obtaining a data stream comprising a first sequence of values; duplicating of the first sequence of values; offsetting the duplicate first sequence of values; generating a randomized sequence of values; braiding the first sequence of values, the offset duplicate first sequence of values, and the randomized sequence of values, creating a braided data sequence; and outputting the braided data sequence.

Clause 10: The method of Clause 9, wherein duplicating the first sequence of values comprises generating a duplicate of the first sequence of values in volatile memory.

Clause 11: The method of Clause 9 or Clause 10, wherein duplicating the first sequence of values comprises storing the first sequence of values in a time-delayed buffer.

Clause 12: The method of any of Clauses 9-11, wherein offsetting the duplicate first sequence of values comprises feeding the duplicate first sequence of values through a delay circuit.

Clause 13: The method of any of Clauses 9-12, where outputting the braided data sequence comprises transmitting the braided data sequence to a remote system.

Clause 14: The method of any of Clauses 9-13 further comprising storing the braided data sequence in a persistent memory.

Clause 15: The method of any of Clauses 9-14 further comprising generating a decoding key for decoding the braided data sequence.

Clause 16: The method of Clause 15 further comprising encrypting the decoding key.

Clause 17: A method of encoding data, comprising: obtaining a first data stream comprising a first sequence of values; obtaining a second data stream comprising a second sequence of values; obtaining a third data stream comprising a third sequence of values; braiding the first sequence of values, the second sequence of values, and the third sequence of values, creating a braided data sequence; and outputting the braided data sequence.

Clause 18: The method of Clause 17, where outputting the braided data sequence comprises transmitting the braided data sequence to a remote system.

Clause 19: The method of Clause 17 or Clause 18 further comprising storing the braided data sequence in a persistent memory.

Clause 20: The method of any of Clauses 17-19 further generating a decoding key for decoding the braided data sequence.

Clause 21: The method of Clause 20 further comprising encrypting the decoding key.

Clause 22: A method of encoding data, comprising: obtaining a data stream comprising a sequence of values; dividing the first sequence of values into a plurality of value sections; braiding the plurality of data sections together, creating a braided data sequence; and outputting the braided data sequence.

Clause 23: The method of Clause 22, wherein dividing the first sequence of values into a plurality of value sections comprises dividing the sequence of values into three sections based on location in the sequence of values.

Clause 24: The method of Clause 22 or Clause 23, wherein dividing the first sequence of values into a plurality of value sections comprises storing portions of the data stream in a plurality of separate buffers based on time of receipt of the data stream.

Clause 25: The method of Clause 24, wherein the plurality of separate buffers correspond to different sections of the plurality of value sections.

Clause 26: The method of any of Clauses 22-25, where outputting the braided data sequence comprises transmitting the braided data sequence to a remote system.

Clause 27: The method of any of Clauses 22-26 further comprising storing the braided data sequence in a persistent memory.

Clause 28: The method of any of Clauses 22-27 further comprising generating a decoding key for decoding the braided data sequence.

Clause 29: The method of Clause 28 further comprising encrypting the decoding key.

Clause 30: A non-transitory computer-readable medium having stored thereon computer program code that, when executed by a processor, instructs the processor to perform the method according to any of Clauses 1-29.

Clause 31: An apparatus comprising: a processor; and a memory having stored thereon computer program code that, when executed by the processor, instructs the processor to perform the method according to any of Clauses 1-29.

While the preferred embodiment to the disclosure had been described, those skilled in the art, both now and in the future, may make various improvements and/or enhancements which fall within the scope of the claims which follow. These claims should be construed to maintain the proper protection for the disclosure first described.

What is claimed is:

1. A method of encoding data, comprising:
obtaining a data stream comprising a first sequence of values;
duplicating of the first sequence of values;
offsetting the duplicate first sequence of values;
braiding the first sequence of values together with the offset duplicate first sequence of values, creating a braided data sequence, the braided data sequence comprising the first sequence of values interwoven with the offset duplicate first sequence of values;
generating a decoding key for decoding the braided data sequence, the decoding key identifying which values in the braided data sequence correspond to the first sequence of values and which values in the braided data sequence correspond to the duplicated first sequence of values; and
outputting the braided data sequence.

2. The method of claim 1, wherein duplicating the first sequence of values comprises generating a duplicate of the first sequence of values in volatile memory.

3. The method of claim 1, wherein duplicating the first sequence of values comprises storing the first sequence of values in a time-delayed buffer.

4. The method of claim 1, wherein offsetting the duplicate first sequence of values comprises feeding the duplicate first sequence of values through a delay circuit.

5. The method of claim 1, where outputting the braided data sequence comprises transmitting the braided data sequence to a remote system.

6. The method of claim 1 further comprising storing the braided data sequence in a persistent memory.

7. The method of claim 1 further comprising encrypting the decoding key.

8. The method of claim 1, wherein the braided data sequence provides redundancy by comprising the first sequence of values and the offset duplicate first sequence of values.

9. The method of claim 1, wherein the braided data sequence provides data encryption by interweaving the first sequence of values with the offset duplicate first sequence of values.

10. The method of claim 1, wherein the decoding key identifies which values in the braided data sequence correspond to the first sequence of values and which values in the braided data sequence correspond to the offset duplicate first sequence of values.

11. A method of encoding data, comprising:
obtaining a data stream comprising a first sequence of values;
duplicating of the first sequence of values;
offsetting the duplicate first sequence of values;
generating a randomized sequence of values;
braiding the first sequence of values together with the offset duplicate first sequence of values and the randomized sequence of values, creating a braided data sequence, the braided data sequence comprising the first sequence of values interwoven with the offset duplicate first sequence of values and the randomized sequence of values; and
generating a decoding key for decoding the braided data sequence, the decoding key identifying which values in the braided data sequence correspond to the first sequence of values and which values in the braided data sequence correspond to the duplicated first sequence of values;
outputting the braided data sequence.

12. The method of claim 11, wherein duplicating the first sequence of values comprises generating a duplicate of the first sequence of values in volatile memory.

13. The method of claim 11, wherein duplicating the first sequence of values comprises storing the first sequence of values in a time-delayed buffer.

14. The method of claim 11, wherein offsetting the duplicate first sequence of values comprises feeding the duplicate first sequence of values through a delay circuit.

15. The method of claim 11, where outputting the braided data sequence comprises transmitting the braided data sequence to a remote system.

16. The method of claim 11 further comprising:
encrypting the decoding key.

17. A method of encoding data, comprising:
obtaining a first data stream comprising a first sequence of values;
obtaining a second data stream comprising a second sequence of values;
obtaining a third data stream comprising a third sequence of values;
duplicating of the first sequence of values;
offsetting the duplicate first sequence of values;
braiding the first sequence of values together with the second sequence of values, the third sequence of values, and the offset duplicate first sequence of values, creating a braided data sequence, the braided data sequence comprising the first sequence of values interwoven with the second sequence of values, the third sequence of values, and the offset duplicate first sequence of values;
outputting the braided data sequence; and
generating a decoding key for decoding the braided data sequence, the decoding key identifying which values in the braided data sequence correspond to the first sequence of values, which values in the braided data sequence correspond to the second sequence of values, and which values in the braided data sequence correspond to the third sequence of values.

18. The method of claim 17, where outputting the braided data sequence comprises transmitting the braided data sequence to a remote system.

19. The method of claim 17 further comprising encrypting the decoding key.

* * * * *